US012140668B2

(12) United States Patent
Oh et al.

(10) Patent No.: US 12,140,668 B2
(45) Date of Patent: Nov. 12, 2024

(54) APPARATUS AND METHOD FOR REMOVING NOISE FOR WEATHER RADAR

(71) Applicant: Korea Meteorological Administration, Seoul (KR)

(72) Inventors: Young-A Oh, Seoul (KR); Hae Lim Kim, Seoul (KR); Mi-Kyung Suk, Seoul (KR)

(73) Assignee: Korea Meteorological Administration, Seoul (KR)

( * ) Notice: Subject to any disclaimer, the term of this patent is extended or adjusted under 35 U.S.C. 154(b) by 328 days.

(21) Appl. No.: 17/939,887

(22) Filed: Sep. 7, 2022

(65) Prior Publication Data

US 2023/0094388 A1 Mar. 30, 2023

(30) Foreign Application Priority Data

Sep. 24, 2021 (KR) .................. 10-2021-0126551

(51) Int. Cl.
*G01S 13/95* (2006.01)
*G01S 7/40* (2006.01)

(52) U.S. Cl.
CPC ............ *G01S 13/95* (2013.01); *G01S 7/4008* (2013.01)

(58) Field of Classification Search
CPC .............................. G01S 13/95; G01S 7/4008
See application file for complete search history.

(56) References Cited

U.S. PATENT DOCUMENTS 5,523,759 A * 6/1996 Gillberg ................ G01S 13/953
342/26 B
2019/0277964 A1 * 9/2019 Badin .................... G01S 13/424

FOREIGN PATENT DOCUMENTS

KR 100922130 B1 * 10/2009

* cited by examiner

*Primary Examiner* — Vladimir Magloire
*Assistant Examiner* — Hailey R Le
(74) *Attorney, Agent, or Firm* — Heedong Chae; Lucem, PC

(57) ABSTRACT

The present disclosure relates to an apparatus and method for removing noise for a weather radar and, more particularly, to an apparatus and method for removing noise for a weather radar, the apparatus and method being able to detecting a radio interference echo, which is noise due to radio interference that is generated by reception of other external radio waves to a weather radar except for a radio wave transmitted from the weather radar, separately from weather eco according to normal weather measurement, and being able to remove the radio interference echo.

9 Claims, 8 Drawing Sheets

REFLECTIVITY (LEFT), RADAR VELOCITY (RIGHT) OF CASE OF STRONG CONVECTIVE PRECIPITATION

APPARATUS AND METHOD FOR REMOVING NOISE FOR WEATHER RADAR

CROSS-REFERENCE TO RELATED APPLICATIONS

This application claims the priority of Korean Patent Application No. 10-2021-0126551 filed on Sep. 24, 2021, in the Korean Intellectual Property Office, the disclosure of which is incorporated herein by reference.

BACKGROUND OF THE INVENTION

Field of the Invention

The present disclosure relates to an apparatus and method for removing noise for a weather radar and, more particularly, to an apparatus and method for removing noise for a weather radar, the apparatus and method being able to detecting a radio interference echo, which is noise due to radio interference that is generated by reception of other external radio waves to a weather radar except for a radio wave transmitted from the weather radar, separately from weather eco according to normal weather measurement, and being able to remove the radio interference echo.

Description of the Related Art

A weather radar (hereafter, radar) is equipment that transmits a radio wave (electromagnetic wave or pulse or radar beam) and measures average reflection intensity and location of a target in a sampling volume through the reception power and the reception time of a signal returning after being reflected by rain or snow (hydrometeor) that is the target.

The weather radar can observe a 3D (volume) state of the atmosphere in the form of polar coordination by observing while changing an azimuth angle of 0~360 degrees and an altitude angle of 0~90 degrees of an antenna.

An external radio wave transmitted by other radar equipment such as an airplane that transmits a radio wave around the weather radar may be received to the weather radar when the weather radar receives a radio wave reflected by a target after transmitting the radio wave, and accordingly, radio interference may be generated with the radio wave transmitted from the weather radar due to the external radio wave.

Accordingly, observation information that is provided by the weather radar includes an abnormal echo due to radio interference other than a normal observation echo created on the basis of a radio wave reflected by a target related to weather such as precipitation.

This is described in more detail with reference to FIGS. 1 to 3. First, as shown in FIG. 1, a radio interference echo due to radio interference is usually observed at certain some azimuth angles in a low-layer (low-altitude angle) observation in which an external source may exist. When a radio interference echo is observed in a polar coordination of a radar, values of a reflectivity $Z_H$ and a differential reflectivity $Z_{DR}$ are shown in a slight uniform type in an azimuth direction and the radio interference echo comes out of an observation value in common precipitation because the differential reflectivity is very higher than the reflectivity or a cross correlation coefficient $\rho_{HV}$ is low, so it is easy to remove separately from a precipitation echo that is a weather echo under discrimination condition of the unit of individual radar grid (observation point having a distance r on a polar coordination, an azimuth angle θ, and an altitude angle φ.

A radial velocity ($V_r$) has a characteristic that an observation value is not related to a radio interference echo, but a portion of a radial velocity is lost even in a precipitation echo, so a radial velocity is not used as a discrimination condition in data quality management in a normal observation state to prevent mis-removable of precipitation.

However, when abnormal radio interference is generated, as in FIG. 2, radio interference echoes with various reflectivities may be detected in random directions up to a high altitude angle.

In this case, as shown in FIG. 3, since the values of cross correlation coefficient and differential reflectivity are widely measured including a precipitation echo, it is difficult to completely discriminate the radio interference echoes from a precipitation echo unlike common radio interference echoes.

Further, since such abnormal radio interference echoes are different in characteristic from other non-weather echoes such as waves, chaff, and an abnormal radio wave, there is a need for specified characteristic variable and discrimination condition in order to completely discriminate and remove abnormal radio interference echoes from a precipitation echo.

Documents of Related Art

Patent Document

Korean Patent No. 10-1846294

SUMMARY OF THE INVENTION

An objective of the present disclosure is to discriminate and accurately detect an abnormal radio interference echo, which is generated in observation information created on the basis of an echo signal of a weather radar due to radio interference between an external radio wave and a reflective wave received when an external radio wave that is not a radio wave transmitted from a weather radar is received to the weather radar and the radio wave transmitted from the weather radar is reflected by a target, from a normal weather echo, and to give a support to be able to increase accuracy of observation information by effectively removing the abnormal radio interference echo.

A method of removing noise for a weather radar of an apparatus for removing noise according to an embodiment of the present disclosure includes: a data creation step of creating data information including one or more items of observation information including an echo corresponding to an echo signal received from the weather radar based on the echo signal; a determiner configured to calculate an average reflectivity of reflectivities for one or more echoes corresponding to azimuth angles for each azimuth angle at which one or more echoes exist of a plurality of azimuth angles included in the observation information, and then calculate the number of interest azimuth angles that are azimuth angles at which the average reflectivity satisfies a preset radio interference discrimination condition, thereby calculating the number of the interest azimuth angles for each of one or more items of observation information, and configured to determine whether radio interference is generated for the data information by comparing the number of interest azimuth angles of each of one or more items of observation information with a preset reference for determining whether radio interference is generated; and a removal step of, when radio interference was generated in the data information through the determination step, calculating an average differential reflectivity of one or more differential reflectivities of echoes corresponding to azimuth angles, respectively, included in one or more items of observation information for each of the items of observation information included in the data information, of setting a radio interference-possible section in the observation information based on the average differential reflectivity of each azimuth angle, and of removing radio interference echo by applying a preset critical condition to a plurality of grids included in the radio interference-possible section when the radio reference echo, which is an echo generated due to radio interference, is included in a grid.

As an example related to the present disclosure, the echo is composed of data including a location of a target corresponding to the echo signal, an azimuth angle corresponding to the target, an altitude angle corresponding to the target, a reflectivity corresponding to the target, and a differential reflectivity corresponding to the target.

As an example related to the present disclosure, the determination step calculates the average reflectivity $$\overline{Z_H(\theta, \phi)}$$

from $$\overline{Z_H(\theta, \phi)} = \frac{\sum_{r=2.5km}^{r_{max}} \left[ Z_H(r, \theta, \phi) \times \frac{r(r, \theta, \phi)}{r_{max}} \right]}{\sum_{r=2.5km}^{r_{max}} \frac{r(r, \theta, \phi)}{r_{max}}}$$

where $Z_H$ is a reflectivity, r is an observation radius, $r_{max}$ is a maximum observation radius, $\theta$ is an azimuth angle, and $\varphi$ is altitude angle.

As an example related to the present disclosure, the determination step determines, for a plurality of azimuth angles included in the observation information, whether $$\overline{Z_{H_{ALL}}(\theta, \phi)}$$

that is the average reflectivity calculated for all regions corresponding to the azimuth angle satisfies $$\overline{Z_{H_{ALL}}(\theta, \phi)} > (60.0 - \phi)[dBZ]$$

that is a first condition according to a preset radio interference discrimination condition in the observation information or whether $$\overline{Z_{H_{NoV_r}}(\theta, \phi)}$$

that is the average reflectivity calculated for regions in which a radar velocity does not exist of regions corresponding to the azimuth angles satisfies $$\overline{Z_{H_{NoV_r}}(\theta, \phi)} > (45.0\phi)[dBZ]$$

that is a second condition according to a preset radio interference discrimination condition, and determines azimuth angles satisfying the first condition or the second condition as interest azimuth angles in which the radio interference echo exists.

As an example related to the present disclosure, the determination step determines that radio interference was generated in the data information when the data information includes the one or more items of observation information corresponding to the one or more altitude angles, respectively, and the number of the interest azimuth angles included in at least one of the one or more items of observation information exceeds 3; and determines that radio interference was generated in the data information when the data information includes observation information that is the volume information and the number of interest azimuth angles included in the observation information exceeds 5.

As an example related to the present disclosure, the observation information includes a plurality of grids that is discriminated by an observation radius, an altitude angle, and an azimuth angle, and the removable step calculates $$\overline{Z_{DR}(\theta, \phi)}$$

that is the average differential reflectivity from $$\overline{Z_{DR}(\theta, \phi)} = \frac{\sum_{r}^{r+10km} |Z_{DR}(r, \theta, \phi)|}{n}$$

for each azimuth angle from the observation information, where r is an observation angle, $\theta$ is an azimuth angle, $\varphi$ is an altitude angle, and n is the number of grids that are used to calculate the average differential reflectivity from the observation information.

As an example related to the present disclosure, the removal step sets, for each of azimuth angles included in the observation information, a section from an observation radius, at which an average differential reflectivity of the azimuth angles is calculated as 75% of a value designated in advance as a precipitation range, to a maximum observation radius of the observation information corresponding to the azimuth angles, as a radio interference-possible section corresponding to the azimuth angles.

As an example related to the present disclosure, the removal step determines that the radio interference echo is included in grids that satisfy $Z_{DR}>5.0$ [dB]*0.75 according to the critical condition or satisfy Vr=null or Vr>50.0 [m/s] according to the critical condition for each of a plurality of grids included in one or more radio interference-possible sections corresponding to one or more azimuth angles, respectively, for the radio interference-possible sections, and removes the radio interference echo from grids including the radio interference echo.

An apparatus for removing noise for a weather radar according to an embodiment of the present disclosure includes: a data creator configured to create data information including one or more items of observation information including an echo corresponding to an echo signal received from a weather radar based on the echo signal; a determiner configured to calculate an average reflectivity of reflectivities for one or more echoes corresponding to azimuth angles for each azimuth angle at which one or more echoes exist of a plurality of azimuth angles included in the observation information, and then calculate the number of interest azimuth angles that are azimuth angles at which the average reflectivity satisfies a preset radio interference discrimination condition, thereby calculating the number of the interest azimuth angles for each of one or more items of observation information, and configured to determine whether radio interference is generated for the data information by comparing the number of interest azimuth angles of each of one or more items of observation information with a preset reference for determining whether radio interference is generated; and a remover configured to, when radio interference was generated in the data information, calculate an average differential reflectivity of one or more differential reflectivities of echoes corresponding to azimuth angles, respectively, included in one or more items of observation information for each of the items of observation information included in the data information, to set a radio interference-possible section in the observation information based on the average differential reflectivity of each azimuth angle, and to remove radio interference echo by applying a preset critical condition to a plurality of grids included in the radio interference-possible section when the radio reference echo, which is an echo generated due to radio interference, is included in a grid.

The present disclosure has an effect of discriminating and accurately detecting an abnormal radio interference echo, which is generated in observation information created on the basis of an echo signal of a weather radar due to radio interference between an external radio wave and a reflective wave received when an external radio wave that is not a radio wave transmitted from a weather radar is received to the weather radar and the radio wave transmitted from the weather radar is reflected by a target, from a normal weather-related echo, and of giving a support to be able to increase accuracy of observation information by effectively removing the abnormal radio interference echo.

DETAILED DESCRIPTION OF THE INVENTION

Hereinafter, a detailed embodiment of the present disclosure will be described with reference to the drawings.

Figure 4:
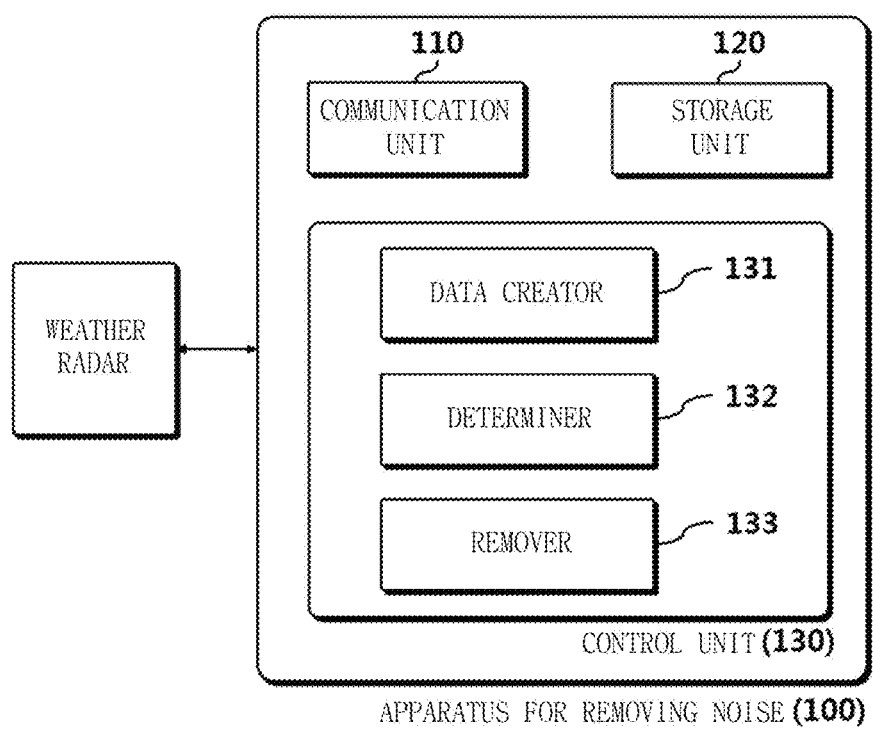
FIG. 4 is a configuration diagram of an apparatus for removing noise for a weather radar according to an embodiment of the present disclosure.

FIG. 4 is a configuration diagram of an apparatus for removing noise for a weather radar (hereafter, an apparatus for removing noise) according to an embodiment of the present disclosure.

As shown in the figures, the apparatus 100 for removing noise may include a communication unit 110 for communicating with a weather radar, a control unit 130 receiving an echo signal from the apparatus 100 for removing noise through the communication unit 110, and a storage unit 120 storing various kinds of information.

The control unit 130 may perform a general control function of the apparatus 100 for removing noise and may include a RAM, a ROM, a CPU, a GPU, and buses, and the RAM, the ROM, the CPU, the GPU, etc. may be connected through the buses.

Of course, at least one of the communication unit 110 and the storage unit 120 may be included in the control unit 130 and the communication unit 110 can communicate with a weather radar through various well-known wired/wireless communication types.

The weather radar may include a transmitter that generates a radio wave (a microwave or radar beam) to be emitted to the atmosphere, an antenna that receives a radio wave that is emitted to the atmosphere and reflected by a target, and a receiver that amplifies and transmits the radio wave, which is reflected by the target and received through the antenna, as an echo signal to the apparatus 100 for removing noise, and may further include a radome for protecting the antenna, a waveguide through which a transmission radio and a reception radio wave move, etc.

The echo signal may mean a signal generated by the receiver on the basis of a reception radio wave and the target may include various weather elements such as cloud, rain, snow, and hail.

An echo signal generated by the weather radar on the basis of a radio wave reflected by a target related to weather such as precipitation is shown as an echo, such as a precipitation echo, in observation information created through the apparatus 100 for removing noise.

An echo included in observation information described in the present disclosure may mean data created by processing the echo signal in the control unit 130, and the observation information may be a radarscope image including a plurality of preset grids including the echo. The radarscope image may mean an image that is displayed on a physical radarscope or an image including a virtual radarscope.

The echo signal may include information, such as the location (coordinates) of a target that corresponds to the echo signal, an azimuth angle corresponding to the target, an altitude angle corresponding to the target, a reflectivity measured to correspond to the target, a differential reflectivity measured to correspond to the target, and a radar velocity measured to correspond to the target, and the echo signal generated on the basis of the echo signal may also include the same information as the echo signal.

The echo, for example, may include various echoes such as a precipitation echo (or weather echo) and a non-precipitation echo (or non-weather echo).

In the configuration described above, in the weather measurement process using a radio wave of the weather radar, radio interference may be generated between an external radio wave and a reflective wave received when an external radio wave that is not a radio wave transmitted from a weather radar is received to the weather radar and the radio wave transmitted from the weather radar is reflected by a target; and the weather radar generates a signal generated by radio interference also as an echo signal.

An echo signal generated by such radio interference is included in observation information as a radio interference echo and the radio interference echo, as described above, makes it difficult to observe a precipitation echo related to weather.

Accordingly, it is required to discriminate and remove such a radio interference echo from a precipitation echo and the detailed configuration of the apparatus 100 for removing noise for this purpose is described hereafter in detail with reference to the drawings on the basis of the configuration described above.

Figure 5:
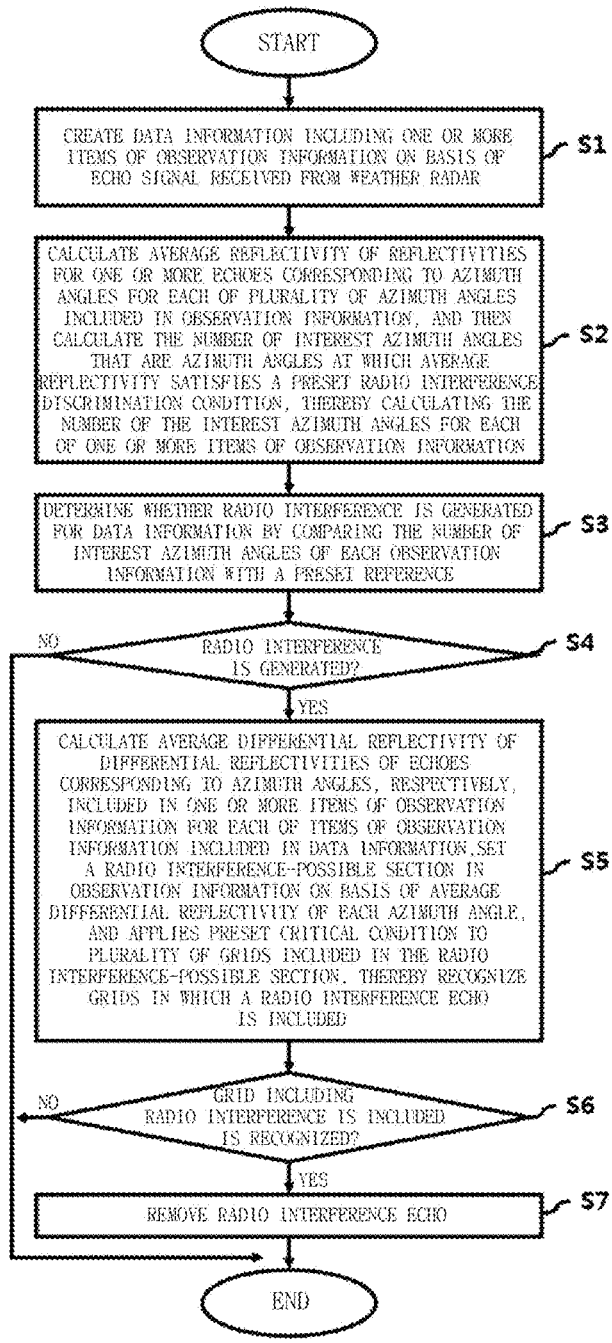
FIG. 5 is a flowchart of a noise removal method of the apparatus for removing noise for a weather radar according to an embodiment of the present disclosure.

First, FIG. 5 is an operation flowchart of the apparatus 100 for removing noise according to an embodiment of the present disclosure.

This is described in detail on the basis of the configuration of the control unit 130 the performs a general control function of the apparatus 100 for removing noise shown in FIG. 4.

First, the control unit 130 may include a data creator 131, a determiner 132, and a remover 133.

First, the data creator 131 can receive an echo signal from the weather radar through the communication unit 110 and can create data information including one or more items of observation information including an echo corresponding to the echo signal on the basis of the echo signal received from the weather radar (S1).

The data creator 131 can create the echo signal as an echo that is a radarscope or a datum displayed in a radarscope-related image, and can create one or more items of observation information including a plurality of echoes respectively corresponding to a plurality of echo signals received from the weather radar through the communication unit 110.

The data creator 131 can create data information including the one or more items of observation information to correspond to a specific time or specific hours on the basis of one or more echo signals received at the specific time or the specific hours.

The data information may include one or more items of observation information corresponding to one or more altitude angles, respectively, or may include one item of observation information composed of volume information for all altitude angles.

For example, the data creator 131 can create observation information corresponding to a single altitude angle for each of a plurality of different altitude angles on the basis of a plurality of echo signals that is received through the communication unit 110, and can create data information including a plurality of items of observation information created to correspond to the plurality of altitude angles, respectively.

Alternatively, the data creator 131 can create observation information composed of volume information, in which an echo signal (or an echo) for each of a plurality of different altitude angles is included in one item of observation information, on the basis of a plurality of echo signals received through the communication unit 110, and can create data information including the observation information.

Meanwhile, the determiner 132 can receive data information from the data creator 131.

The determiner 132 calculates an average reflectivity of reflectivities for one or more echoes corresponding to azimuth angles for each azimuth angle (each altitude angle) at which one or more echoes exist of a plurality of azimuth angles included in the observation information, and then calculates the number of interest azimuth angles at which the average reflectivity satisfies a preset radio interference discrimination condition, thereby being able to calculate the number of the interest azimuth angles for each of one or more items of observation information.

As an example for this, the determiner 132 can calculate the average reflectivity $$\overline{Z_H(\theta, \phi)}$$

in accordance with the following Equation 1.

$$\overline{Z_H(\theta, \phi)} = \frac{\sum_{r=2.5km}^{r_{max}} \left[ Z_H(r, \theta, \phi) \times \frac{r(r, \theta, \phi)}{r_{max}} \right]}{\sum_{r=2.5km}^{r_{max}} \frac{r(r, \theta, \phi)}{r_{max}}} \quad \text{[Equation 1]}$$

where $Z_H$ may be a reflectivity (reflectivity of an echo), r may be an observation radius, $r_{max}$ may be a maximum observation radius, $\theta$ may be an azimuth angle, and $\phi$ may be an altitude angle.

The observation radius and the maximum observation radius may mean radii based on the center of the observation information.

That is, the determiner 132 can calculate the number of radio interference azimuth angles having an intense reflectivity (the number of interest azimuth angles) by calculating an average reflectivity within each azimuth angle at all altitude angles as a characteristic variable to determine whether abnormal radio interference is generated.

To this end, a weight value is applied to the observation radius r (or the observation distance) by reflecting the characteristic that the reflectivity of a radio interference echo slightly decreases at a short distance, as in Equation 1, and since a high reflectivity may be observed from a topographical echo, a reflectivity CZ employing a topological filter is used to exclude a high reflectivity. It is preferable to exclude data within 2.5 km in which the quality of data is low.

Meanwhile, in the configuration described above, the determiner 132 can recognize the interest azimuth angle using the preset radio interference discrimination condition, which is described in detail.

The determiner 132 can determine whether $$\overline{Z_{H_{ALL}}(\theta, \phi)}$$

that is the average reflectivity calculated from Equation 1 satisfies a first condition (the following Equation 2) according to a preset radio interference discrimination condition for all regions corresponding to a specific azimuth angle for the specific azimuth angle in observation information.

Further, the determiner 132 can determine whether $$\overline{Z_{H_{NoV}}(\theta, \phi)}$$

that is the average reflectivity calculated from Equation 1 satisfies a second condition (the following Equation 3) according to a preset radio interference discrimination condition for a region in which a radar velocity does not exist of regions corresponding to the specific azimuth angle in the observation information.

In this case, the determiner 132 can recognize a region (or one or more regions) in which a radar velocity does not exist of regions corresponding to the specific azimuth angle in the observation information o the basis of one or more echoes corresponding to the specific azimuth angle.

Accordingly, when the average reflectivity calculated for all regions corresponding to the specific azimuth angle satisfies the first condition or when the average reflectivity calculated for a region, which corresponds to the specific azimuth angle and in which a radar velocity does not exist, satisfies the second condition, as the result of determination for the specific azimuth angle, the determiner 132 can determine the specific azimuth angle as an interest azimuth angle in which a radio interference echo that is an echo generated by radio interference (radio interference echo corresponding to an echo signal generated by radio interference) exists.

$$\overline{Z_{H_{ALL}}(\theta, \phi)} > (60.0 - \phi)[dBZ] \quad \text{[Equation 2]}$$

$$\overline{Z_{H_{NoV}}(\theta, \phi)} > (45.0 - \phi)[dBZ] \quad \text{[Equation 3]}$$

Further, the determiner 132 can recognize azimuth angles corresponding to an interest azimuth angle of a plurality of azimuth angles included in the observation angle by determining whether the plurality of azimuth angles is an interest azimuth angle in the same way of determining whether the specific azimuth angle is an interest azimuth angle on the basis of the radio interference discrimination condition described above.

That is, two kinds of average reflectivities $$\overline{Z_{H_{ALL}}(\theta, \phi)} \text{ and } \overline{Z_{H_{NoV}}(\theta, \phi)}$$

are calculated in accordance with a data use condition when calculating an average reflectivity at every azimuth angle, and the first condition and the second condition are applied to each of the average reflectivities, whereby when even one condition corresponds, it is determined as an interest azimuth angle that is a radio interference azimuth angle.

For example, an azimuth-angle average reflectivity over 60 dBz may be observed even though a topological echo or a strong convective precipitation echo is observed, but a strong (high-reflectivity) topological echo is not shown at all azimuth angles and a reflectivity CZ employing a topological filter is used in the present disclosure, thereby excluding influence by a topological echo.

A convective precipitation echo may be misjudged as a radio interference echo because it may be shown with a high reflectivity throughout an azimuth angle, but the present disclosure, for considering this case, applies a critical value (>60 dBZ) greatly larger than an azimuth-angle average reflectivity that can be observed from precipitation to an average reflectivity $$\overline{Z_{H_{ALL}}(\theta, \phi)}$$

using the entire region of an azimuth angle.

However, there is limitation that a high critical value makes it difficult to determine generation of medium-strength radio interference echoes. Accordingly, to make up for the limitation, it is possible to discriminate even medium-strength radio interference echoes from a precipitation echo by additionally calculating an average reflectivity $$\overline{Z_{H_{NoV}}(\theta, \phi)}$$

using only a region without a radar velocity for an azimuth angle and by applying a relatively attenuated lower critical value, using the characteristic that most radar velocities of precipitation echoes have an effective value except for some losses unlike radio interference echoes of which most radar velocities do not have an effective value.

Figure 6:
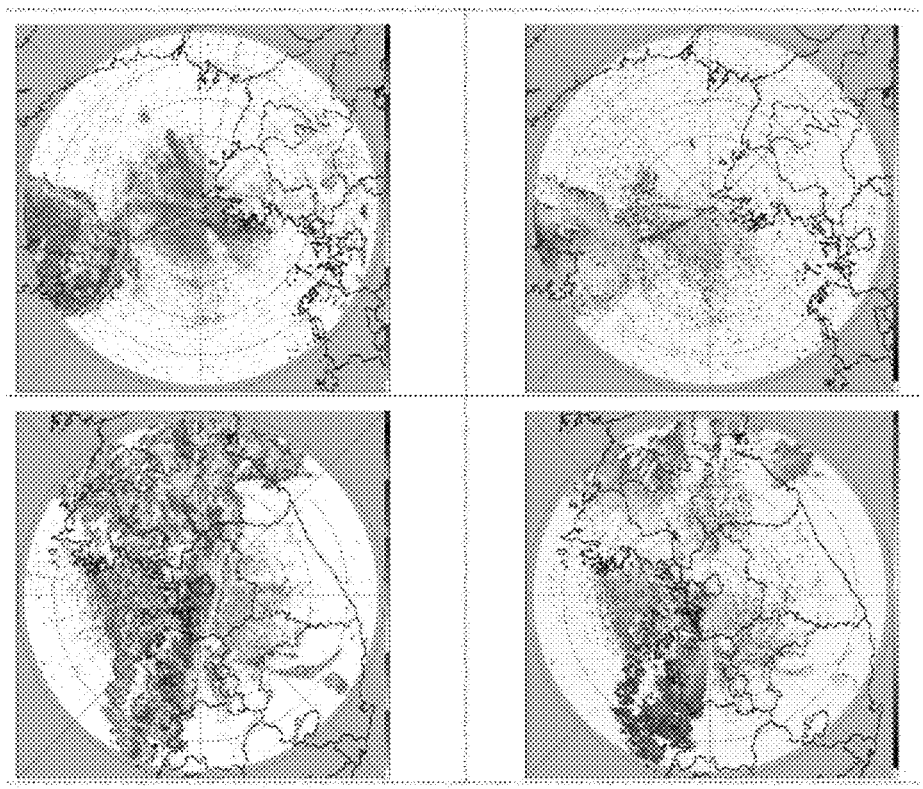
FIGS. 6 to 8 are exemplary views related to detection and removal of noise for observation information of the apparatus for removing noise for a weather radar according to an embodiment of the present disclosure.

As an example of the above description, as shown in FIG. 6, a very high reflectivity may be observed throughout one azimuth angle even from linear strong convective precipitation.

In order to consider this matter, it is possible to determine whether a radio interference echo for a specific azimuth angle according to the average reflectivity $$\overline{Z_H(\theta, \phi)}$$

by designating a large value, which cannot be obtained from a precipitation echo, for a radio interference discrimination condition for an azimuth-angle average reflectivity, as in Equation 2, or by applying two conditions for calculating an average value by limiting only a radio interference region, as in Equation 3.

The radio interference discrimination condition described above can be applied to radar data in which a radar observation radius is 200 km or more (or an observation altitude angle is 3.5° or more) in consideration of the space scale of a convective precipitation system, and the critical value of each condition was calculated by reflecting an average reflective value that cannot be obtained from a precipitation echo.

In this case, since the higher the altitude angle, the higher the observation altitude in accordance with a distance due to the curvature of the earth and the lower the possibility of observation of a strong precipitation region, it was attempted to increase a radio interference azimuth angle detection ratio of a high altitude angle by adjusting (attenuating) the critical value to an altitude angle. When a partial precipitation region in which a very strong reflective polar value (>60 dBZ) exists like hail is included, an intended average value characteristic from a characteristic variable $$\overline{Z_H(\theta, \phi)}$$

may be distorted (a radio interference echo has a high value in the entire section), an appropriate upper limit value $$\left(\text{e.g., } \overline{Z_{H_{ALL}}(\theta, \phi)} \text{ is } 62.5 \ dBZ, \overline{Z_{H_{NoV}}(\theta, \phi)} \text{ is } 52.5 \ dBZ\right)$$

was applied when averaging a reflectivity so that misjudgment is not generated due to contamination of the characteristic variable.

Meanwhile, the determiner 132 can determine whether radio interference is generated for the data information by comparing the number of interest azimuth angles of each of one or more items of observation information with a preset reference for determining whether radio interference is generated (S3).

For example, the determiner 132 can determine that radio interference was generated in the data information when the data information includes one or more items of observation information corresponding to one or more altitude angles, respectively, and the number of the interest azimuth angles included in at least one of the one or more items of observation information exceeds 3.

Alternatively, the determiner 132 can determine that radio interference was generated in the data information when the data information includes one item of observation information that is the volume information and the number of interest azimuth angles included in the observation information exceeds 5.

Weather radar observation generally observes one plane with intervals of 1° throughout a 360° direction and performs observation for several altitude angles, thereby collecting data about 3D atmosphere in a polar coordination type.

A weather radar performs volume observation for nine altitude angles with intervals of 5 minutes and the apparatus 100 for removing noise can process observation information in the unit of each altitude angle (single altitude angle plan data) or can process observation information and one volume datum for all altitude angles. Accordingly, in the present disclosure, when a strong radio interference direction in which the number of interest azimuth angles exceeds 3 in observation information corresponding to a single altitude angle or the number of interest azimuth angles of all azimuth angles exceeds 5 in observation information that is a volume datum is detected, data information of the corresponding time can be defined to be determined as data in which a radio interference echo was generated.

In this case, when the number of interest azimuth angles corresponding to specific data information (the number of radio interference azimuth angles) is calculated as 0, the determiner 132 can process the specific data information as information in which a radio interference echo is not generated.

Meanwhile, when radio interference was generated in the data information (S4), the remover 133, in cooperation with the determiner 132, calculates an average differential reflectivity of one or more differential reflectivities of echoes corresponding to azimuth angles, respectively, included in one or more items of observation information for each of the items of observation information included in the data information, sets a radio interference-possible section in the observation information on the basis of the average differential reflectivity of each azimuth angle, and applies a preset critical condition to a plurality of grids included in the radio interference-possible section, thereby being able to recognize grids in which a radio interference echo, which is an echo generated by radio interference, is included (S5).

Further, the remover 133 can perform a function of removing the radio interference echo included in a grid for each of grids recognized as including the radio interference echo (S6, S7).

That is, calculates an average differential reflectivity of differential reflectivities of one or more echoes, respectively, corresponding to a plurality of azimuth angles, respectively, included in observation information included in the data information, sets a radio interference-possible section with a high possibility of generation of radio interference in the observation information on the basis of the average differential reflectivity calculated for each of the azimuth angles, and determine whether a radio interference echo is included in a plurality of grids included in the radio interference section by applying a preset critical condition to the grids, thereby being able to perform a function of removing a radio interference echo when the radio interference echo is included, and to perform the function for all of items of observation information included in the data information.

In this case, the observation information may include a plurality of grids that is discriminated by an observation radius, an altitude angle, and an azimuth angle.

As an example for this, the remover 133 can calculate $$\overline{Z_{DR}(\theta, \phi)}$$

that is an average reflectivity for each azimuth angle from the observation information in accordance with the following Equation 4.

$$\overline{Z_{DR}(\theta, \phi)} = \frac{\sum_{r}^{r+10km} |Z_{DR}(r, \theta, \phi)|}{n} \quad \text{[Equation 4]}$$

where r may be an observation angle, θ may be an azimuth angle, φ may be an altitude angle, and n may be the number of grids that are used to calculate the average differential reflectivity from the observation information.

Further, the remover 133 can set, for each of azimuth angles included in the observation information, a section from an observation radius r, at which the average differential reflectivity of the azimuth angles is calculated as 75% of a value designated in advance as a precipitation range, to a maximum observation radius $r_{max}$ of the observation information corresponding to the azimuth angles, as a radio interference-possible section corresponding to the azimuth angles.

That is, the remover 133 can calculate an observation radius at which the average differential reflectivity is 75% of a value designated in advance as a precipitation range through Equation 4 for each one or more azimuth angles included in the observation information, and can set the section between the calculated observation radius and the maximum observation radius.

Accordingly, the remover 133 can set one or more radio interference-possible section corresponding to the one or more azimuth angles, respectively, in the observation information.

In this case, the value designated in advance as a precipitation range may be set as any one of values less than 5 dB.

Further, the remover 133 recognizes grids, which satisfy the following Equation 5 according to the critical condition or satisfy the following Equation 6 according to the critical condition for each of a plurality of grids included in one or more radio interference-possible sections corresponding to one or more azimuth angles, respectively, for the radio interference-possible sections, and determines that the radio interference echo is included in the recognized grids, thereby being able to remove the radio interference echo from the recognized grids.

$$Z_{DR} > 5.0 \text{ [dB]} * 0.75 \quad \text{[Equation 5]}$$

$$V_r = \text{null or } V_r > 50.0 \text{ [m/s]} \quad \text{[Equation 6]}$$

where $Z_{DR}$ may be a differential reflectivity of an echo included in a grid and $V_r$ may be a radar velocity of an echo included in a grid.

That is, when determining the radio interference was generated in data information in cooperation with the determiner 132, the remover 133 can remove the radio interference by applying an additional discrimination condition to each of radar observation grids (r, θ, φ).

Figure 7:
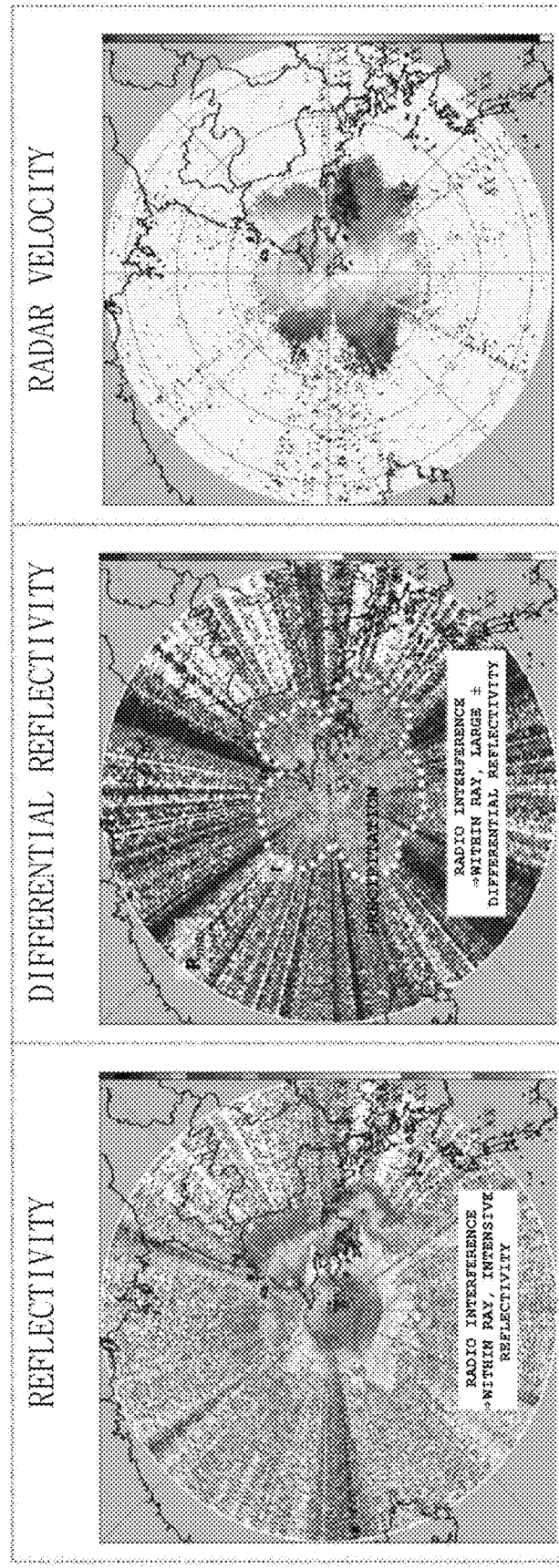

For example, as shown in FIG. 7, when a precipitation echo and a radio interference echo are both observed, the precipitation echo may be misjudged and removed when the critical condition is applied. Accordingly, it is possible to determine a radio interference-possible section of every azimuth angle (the dotted line (or dashed line)~end $r_{max}$ of the observation radius in the differential reflectivity image of FIG. 7), using the characteristic of a radio interference echo, in which a differential reflectivity observation value has a large positive (+) or negative (−) value in comparison to a precipitation region, and to operate the remover 133 only for the corresponding section in the way of applying the critical condition.

In this case, the precipitation echo edge point (distance) should be flexibly determined at each azimuth angle, and the remover 133 calculates an azimuth-angle average differential reflectivity value for a distance section of 10 km, as in Equation 4, and defines the section from a point (distance r), at which the value corresponds to 75% of a precipitation range (<5 dB), to $r_{max}$ as a radio interference-possible section.

Further, the remover 133 determines whether each radar observation point (grids of observation information) is a radio interference echo and removes radio interference echoes by applying a critical condition that uses a differential reflectivity and a radar velocity as discrimination variables, after determining a radio interference-possible section.

Figure 1:
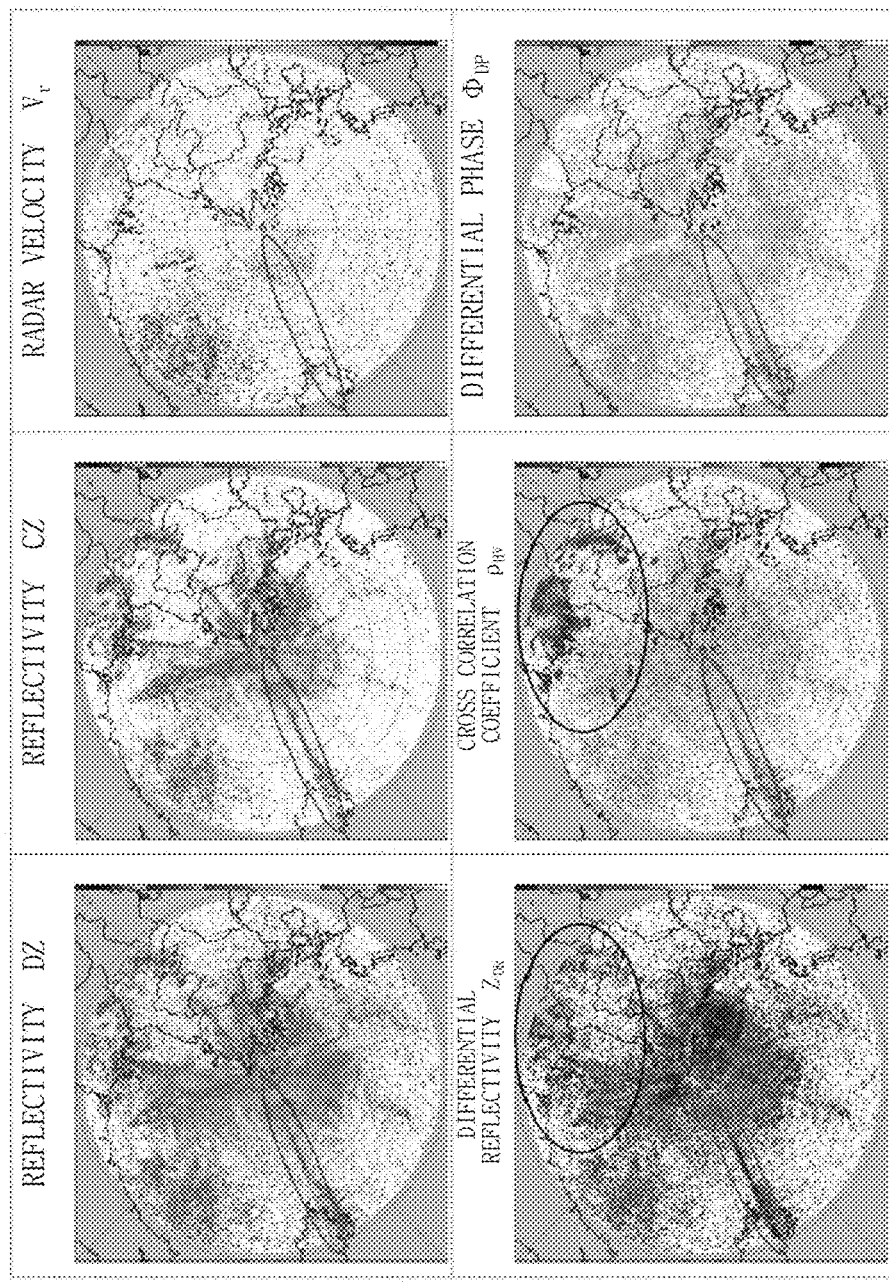
FIGS. 1 to 3 are views showing an abnormal radio interference echo that is generated in a weather radar according to the related art.
Figure 2:
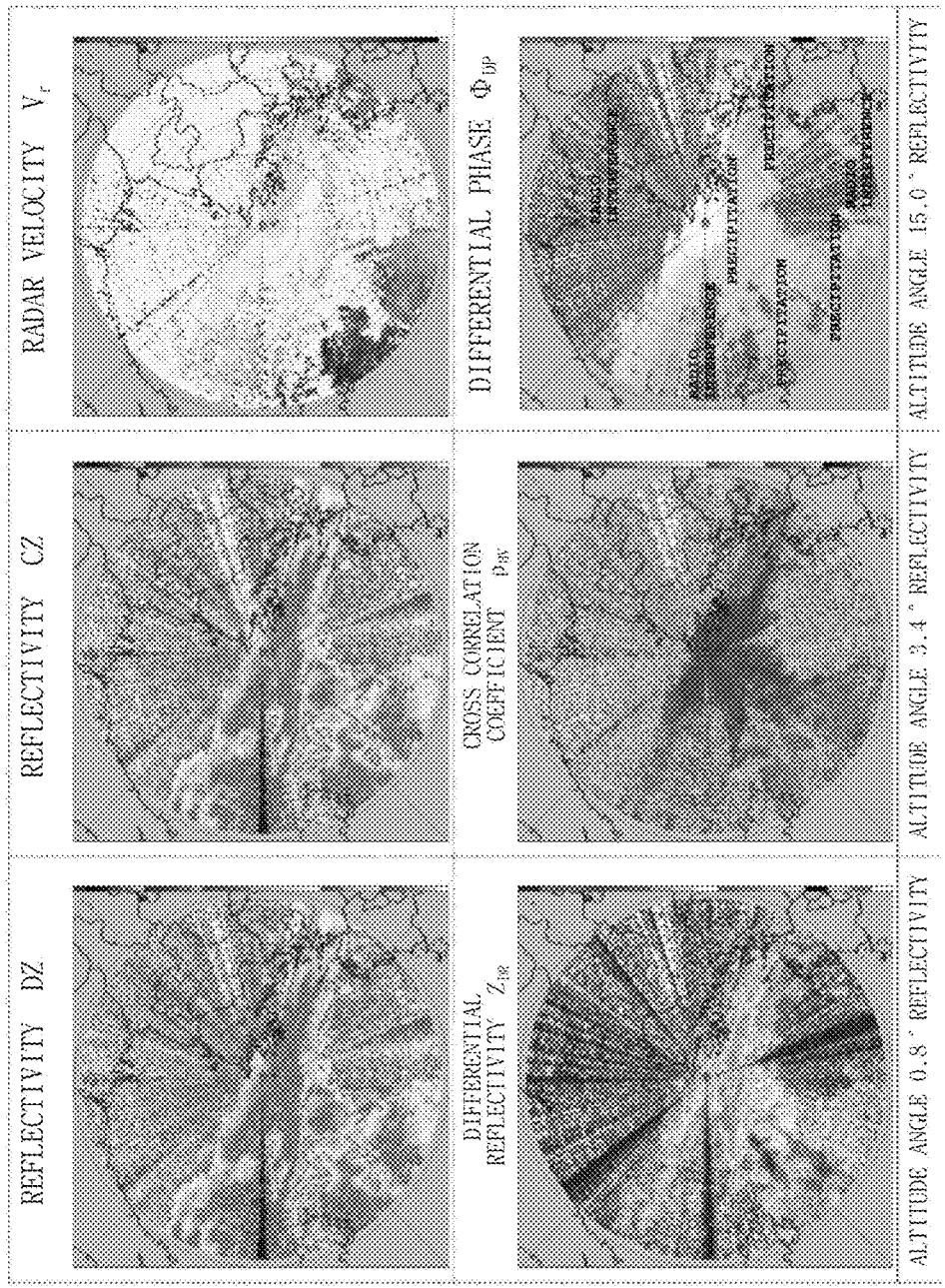
Figure 3:
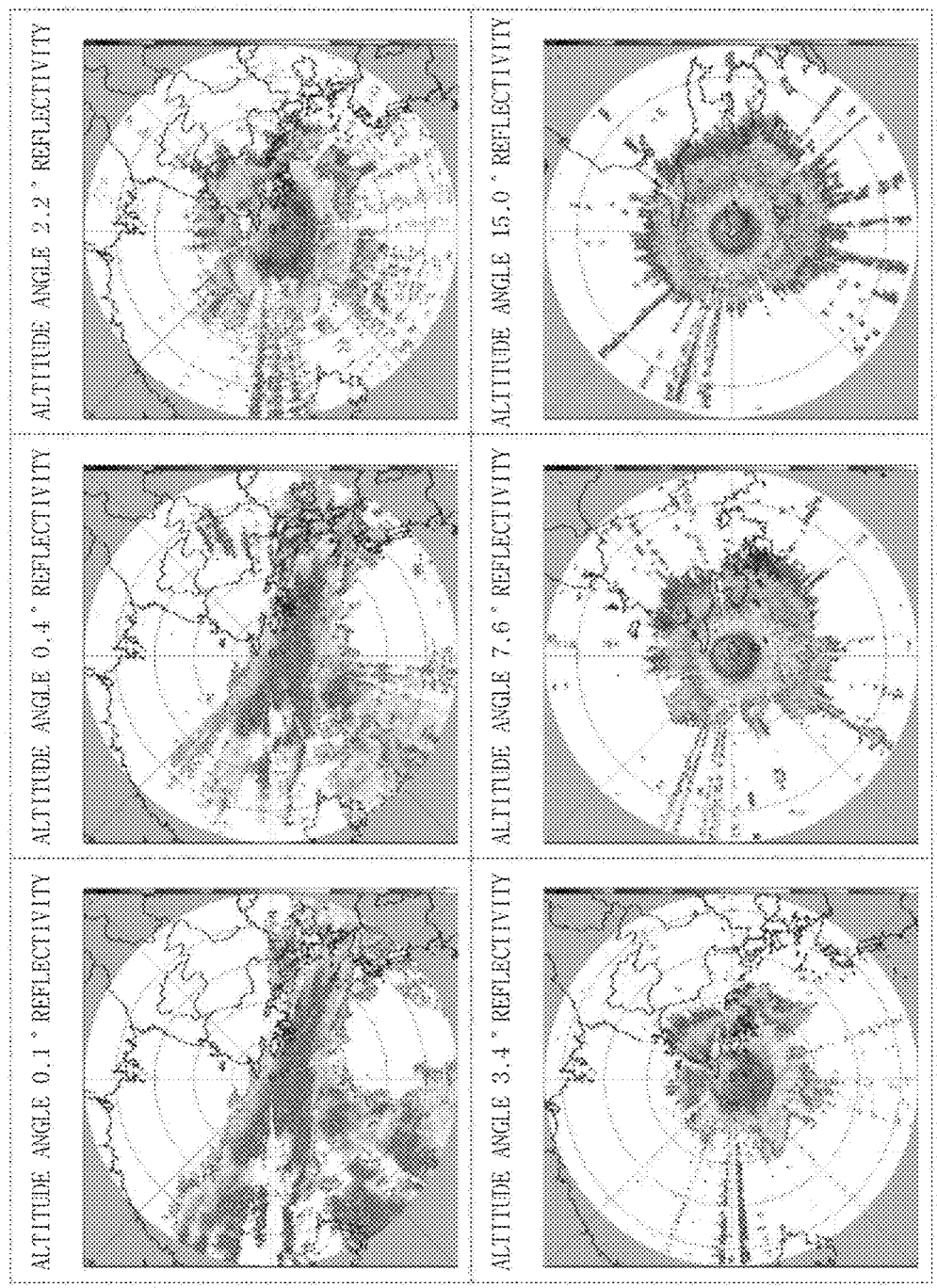
Figure 8:
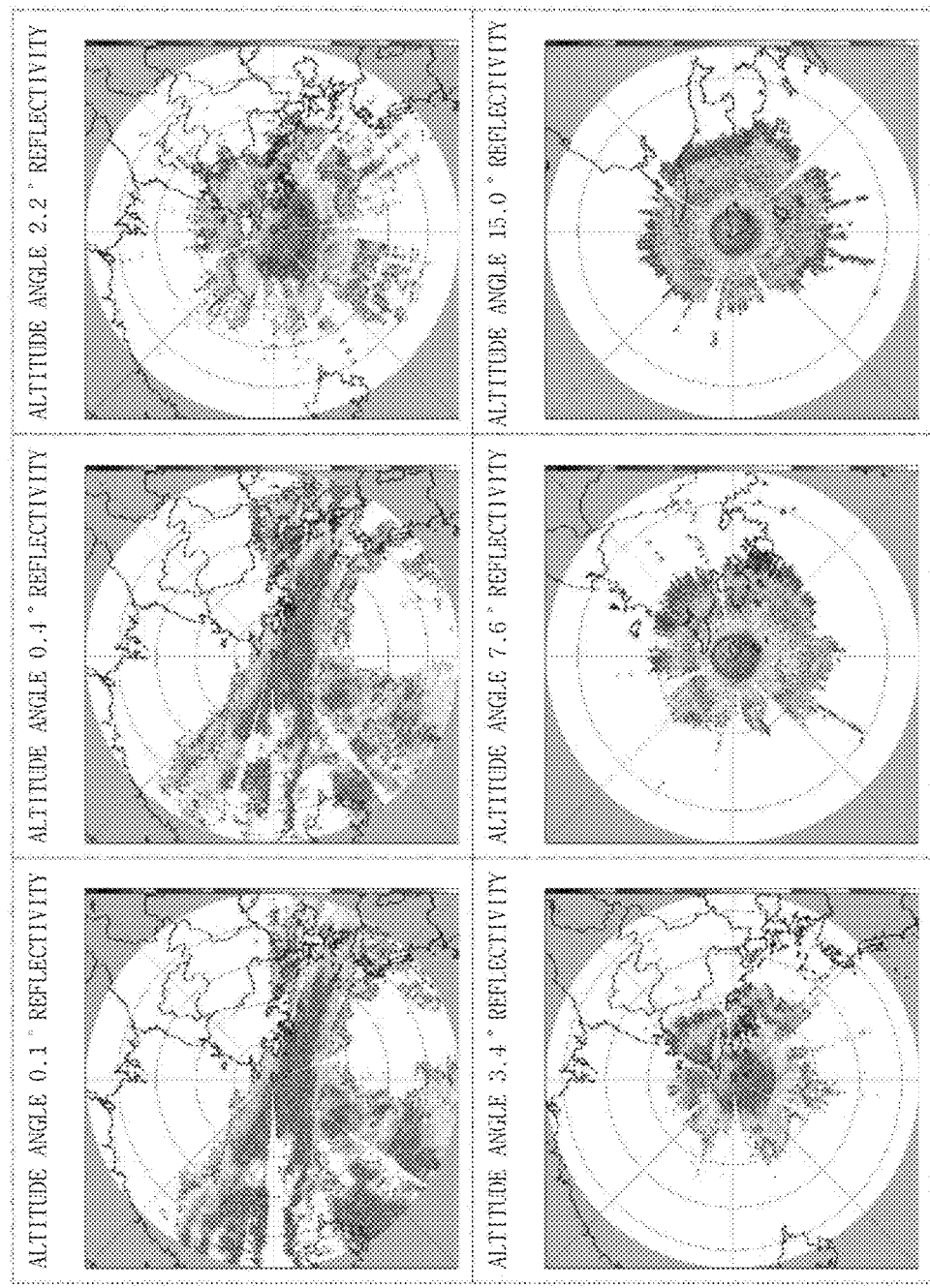

FIG. 8 is an example showing the result according to operations of discriminating and removing radio interference echoes of the apparatus 100 for removing noise according to an embodiment of the present disclosure, and shows the result of effectively discriminating and removing residual radio interference echoes using a characteristic variable and a discrimination condition specified for radio interference echo discrimination according to the present disclosure when applying an existing radar quality management technology optimized for the normal observation state data of FIG. 3.

The dynamic data processing technique of the apparatus 100 for removing noise according to an embodiment of the present disclosure that applies the differentiated data quality management technology to normal abnormal observation states has the advantage that it is possible to further increase the useful value of radar data by solving an unnecessary and excessive loss of precipitation echoes of normal observation and residual radio interference echoes of abnormal observation and it has a high useful value as a site support technology by improving performance of real-time radar grid-based quality management simultaneously with monitoring the observation state of a radar system.

As described above, the present disclosure can discriminate and accurately detect an abnormal radio interference echo, which is generated in observation information created on the basis of an echo signal of a weather radar due to radio interference between an external radio wave and a reflective wave received when an external radio wave that is not a radio wave transmitted from a weather radar is received to the weather radar and the radio wave transmitted from the weather radar is reflected by a target, from a normal weather-related echo, and can give a support to be able to increase accuracy of observation information by effectively removing the abnormal radio interference echo.

The components described in the embodiments of the present disclosure may be achieved by one or more common computers or computers for specific purposes, such as a storage 120, for example, a memory; hardware such as a processor, a controller, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

What is claimed is:

1. A method of removing noise for a weather radar of an apparatus for removing noise, the method comprising:
   a data creation step of creating data information including one or more items of observation information including an echo corresponding to an echo signal received from the weather radar based on the echo signal;
   a determination step of calculating an average reflectivity of reflectivities for one or more echoes corresponding to azimuth angles for each azimuth angle at which one or more echoes exist of a plurality of azimuth angles included in the observation information, and then calculating the number of interest azimuth angles that are azimuth angles at which the average reflectivity satisfies a preset radio interference discrimination condition, thereby being able to calculate the number of the interest azimuth angles for each of one or more items of observation information, and of determining whether radio interference is generated for the data information by comparing the number of interest azimuth angles of each of one or more items of observation information with a preset reference for determining whether radio interference is generated; and
   a removal step of, when radio interference was generated in the data information through the determination step, calculating an average differential reflectivity of one or more differential reflectivities of echoes corresponding to azimuth angles, respectively, included in one or more items of observation information for each of the items of observation information included in the data information, of setting a radio interference-possible section in the observation information based on the average differential reflectivity of each azimuth angle, and of removing radio interference echo by applying a preset critical condition to a plurality of grids included in the radio interference-possible section when the radio reference echo, which is an echo generated due to radio interference, is included in a grid.

2. The method of claim 1, wherein the echo is composed of data including a location of a target corresponding to the echo signal, an azimuth angle corresponding to the target, an altitude angle corresponding to the target, a reflectivity corresponding to the target, and a differential reflectivity corresponding to the target.

3. The method of claim 1, wherein the determination step calculates the average reflectivity $$\overline{Z_H(\theta, \phi)}$$

from $$\overline{Z_H(\theta, \phi)} = \frac{\sum_{r=2.5km}^{r_{max}} \left[ Z_H(r, \theta, \phi) \times \frac{r(r, \theta, \phi)}{r_{max}} \right]}{\sum_{r=2.5km}^{r_{max}} \frac{r(r, \theta, \phi)}{r_{max}}}$$

where $Z_H$ is a reflectivity, r is an observation radius, $r_{max}$ is a maximum observation radius, θ is an azimuth angle, and φ is altitude angle.

4. The method of claim 3, wherein the determination step determines, for a plurality of azimuth angles included in the observation information, whether $$\overline{Z_{H_{ALL}}(\theta, \phi)}$$

that is the average reflectivity calculated for all regions corresponding to the azimuth angle satisfies $$\overline{Z_{H_{ALL}}(\theta, \phi)} > (60.0 - \phi)[dBZ]$$

that is a first condition according to a preset radio interference discrimination condition in the observation information or whether $$\overline{Z_{H_{NoV}}(\theta, \phi)}$$

that is the average reflectivity calculated for regions in which a radar velocity does not exist of regions corresponding to the azimuth angles satisfies $$\overline{Z_{H_{NoV}}(\theta, \phi)} > (45.0 - \phi)[dBZ]$$

that is a second condition according to a preset radio interference discrimination condition, and determines azimuth angles satisfying the first condition or the second condition as interest azimuth angles in which the radio interference echo exists.

5. The method of claim 1, wherein the determination step determines that radio interference was generated in the data information when the data information includes the one or more items of observation information corresponding to the one or more altitude angles, respectively, and the number of the interest azimuth angles included in at least one of the one or more items of observation information exceeds 3; and determines that radio interference was generated in the data information when the data information includes observation information that is the volume information and the number of interest azimuth angles included in the observation information exceeds 5.

6. The method of claim 1, wherein the observation information includes a plurality of grids that is discriminated by an observation radius, an altitude angle, and an azimuth angle, and the removable step calculates $$\overline{Z_{DR}(\theta, \phi)}$$

that is the average differential reflectivity from $$\overline{Z_{DR}(\theta, \phi)} = \frac{\sum_{r}^{r+10km} |Z_{DR}(r, \theta, \phi)|}{n}$$

for each azimuth angle from the observation information, where r is an observation angle, θ is an azimuth angle, φ is an altitude angle, and n is the number of grids that are used to calculate the average differential reflectivity from the observation information.

7. The method of claim 1, wherein the removal step sets, for each of azimuth angles included in the observation information, a section from an observation radius, at which an average differential reflectivity of the azimuth angles is calculated as 75% of a value designated in advance as a precipitation range, to a maximum observation radius of the observation information corresponding to the azimuth angles, as a radio interference-possible section corresponding to the azimuth angles.

8. The method of claim 7, wherein the removal step determines that the radio interference echo is included in grids that satisfy $Z_{DR}$>5.0 [dB]*0.75 according to the critical condition or satisfy Vr=null or Vr>50.0 [m/s] according to the critical condition for each of a plurality of grids included in one or more radio interference-possible sections corresponding to one or more azimuth angles, respectively, for the radio interference-possible sections, and removes the radio interference echo from grids including the radio interference echo.

9. An apparatus for removing noise for a weather radar, comprising:
a data creator configured to create data information including one or more items of observation information including an echo corresponding to an echo signal received from a weather radar based on the echo signal;
a determiner configured to calculate an average reflectivity of reflectivities for one or more echoes corresponding to azimuth angles for each azimuth angle at which one or more echoes exist of a plurality of azimuth angles included in the observation information, and then calculate the number of interest azimuth angles that are azimuth angles at which the average reflectivity satisfies a preset radio interference discrimination condition, thereby calculating the number of the interest azimuth angles for each of one or more items of observation information, and configured to determine whether radio interference is generated for the data information by comparing the number of interest azimuth angles of each of one or more items of observation information with a preset reference for determining whether radio interference is generated; and
a remover configured to, when radio interference was generated in the data information, calculate an average differential reflectivity of one or more differential reflectivities of echoes corresponding to azimuth angles, respectively, included in one or more items of observation information for each of the items of observation information included in the data information, to set a radio interference-possible section in the observation information based on the average differential reflectivity of each azimuth angle, and to remove radio interference echo by applying a preset critical condition to a plurality of grids included in the radio interference-possible section when the radio reference echo, which is an echo generated due to radio interference, is included in a grid.

* * * * *